US008809209B2

(12) United States Patent
Pollino et al.

(10) Patent No.: US 8,809,209 B2
(45) Date of Patent: Aug. 19, 2014

(54) FLUORINATED COPOLYMERS

(75) Inventors: Joel M. Pollino, Elkton, MD (US);
Anilkumar Raghavanpillai, Wilmington, DE (US); Brad M. Rosen, Philadelphia, PA (US); Siddhartha Shenoy, Wilmington, DE (US); Libby Xiaowei Hu, Exton, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 266 days.

(21) Appl. No.: 13/300,999

(22) Filed: Nov. 21, 2011

(65) Prior Publication Data
US 2012/0156417 A1 Jun. 21, 2012

Related U.S. Application Data

(60) Provisional application No. 61/424,219, filed on Dec. 17, 2010.

(51) Int. Cl.
*B32B 5/02* (2006.01)
*B32B 27/04* (2006.01)
*B32B 27/12* (2006.01)

(52) U.S. Cl.
USPC ............. 442/80; 442/79; 442/82; 524/526; 427/427.4; 427/429; 427/430.1; 427/428.01

(58) Field of Classification Search
USPC .............. 442/93–94, 79–80, 82; 428/96, 375, 428/421; 524/546; 427/428.01
See application file for complete search history.

(56) References Cited

U.S. PATENT DOCUMENTS

| 3,282,905 | A | 11/1966 | Fasick et al. |
| 3,979,469 | A | 9/1976 | Jager |
| 4,344,982 | A | 8/1982 | Chen |
| 5,481,028 | A | 1/1996 | Petrov et al. |
| 5,919,527 | A | 7/1999 | Fitzgerald et al. |
| 6,872,781 | B2 | 3/2005 | Hedhli et al. |
| 7,632,133 | B2 | 12/2009 | Wu |
| 2004/0023016 | A1 | 2/2004 | Cernohous et al. |
| 2004/0242822 | A1* | 12/2004 | Gawrisch et al. ............. 526/266 |
| 2006/0047044 | A1 | 3/2006 | Miller et al. |
| 2007/0173426 | A1 | 7/2007 | Longorria et al. |
| 2007/0197717 | A1 | 8/2007 | Ueda et al. |

FOREIGN PATENT DOCUMENTS

| EP | 472079 | 11/1995 |
| JP | 4320454 | 11/1992 |
| JP | 06025591 | 2/1994 |
| WO | 9511877 | 5/1995 |
| WO | 9700230 | 1/1997 |
| WO | 9739072 | 10/1997 |
| WO | 2007069543 | 6/2007 |
| WO | 2007102933 | 9/2007 |
| WO | 2007102983 | 9/2007 |
| WO | 2007102991 | 9/2007 |

OTHER PUBLICATIONS

Fischer and Eisenbach, Makromol. Chem., Rapid Commun. 9, 503-511 (1988).
Balague et al., Synthesis of fluorinated telomers. Part 1. Telomerization of vinylidene fluoride with perfluoroalkyli ioides. Journal of Fluorine Chemistry, 1995, 70, 215-223, Elesevier.

* cited by examiner

*Primary Examiner* — Lynda M Salvatore

(57) ABSTRACT

A stain resistant, oil and water repellent composition comprising a copolymer prepared from fluorinated methacrylate, carbonate methacrylate, and methacrylic acid or salt thereof, a method of providing stain resistance, oil and water repellency to substrates, and a treated substrate.

20 Claims, No Drawings

FLUORINATED COPOLYMERS

FIELD OF THE INVENTION

This invention relates to copolymers for imparting stain resistance, oil and water repellency for hard substrates and fibrous substrates comprising a copolymer of fluorinated methacrylate, carbonate methacrylate and methacrylic acid or salt thereof.

BACKGROUND OF THE INVENTION

Hard surface substrates such as stone, masonry, concrete, unglazed tile, brick, porous clay and various other substrates and fibrous substrates such as woven and nonwoven fibers, yarns, fabrics, fabric blends, textiles, nonwovens, paper, leather, rugs and carpets are used decoratively and functionally in indoor and outdoor environments. When untreated, these materials are susceptible to staining from water, oil, and foodstuffs such as ketchup, mustard, coffee, cooking oils, wine, and beverages. Several products exist in the marketplace for treating these substrates. Stone and tile treatment products are commonly a copolymer of a fluorinated monomer providing stain release and oil repellency, with a non-fluorinated monomer, for water repellency.

Linert et al., in WO199700230, describe a composition comprising fluoroaliphatic groups, carboxyl containing groups, oxyalkene groups and optionally silyl groups which provide repellency to oil- and water-based stains for porous substrates.

Ueda et al., in US20070197717, describe a masonry treating agent comprising fluoromonomer, a monomer having at least one acid group, and a non-fluorinated monomer having a hydrophobic group.

What is needed are coating copolymers that provide superior performance for stain resistance, oil and water repellency to hard substrates as well as fibrous substrates. Additionally, copolymers that are modified to be dispersed in either organic or aqueous solvents are desired. The present invention meets these needs.

SUMMARY OF THE INVENTION

The present invention comprises copolymers of formula (I)

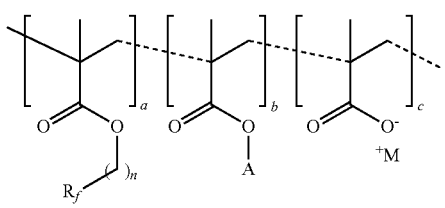

wherein
$R_f$ is $C_2$ to $C_{10}$ fluoroalkyl, optionally interrupted by one or more —O—, —$CH_2$—, —CFH—, or combinations thereof;
n is an integer from 1 to 10;
A is a linear, branched, or cyclic carbonate of formula

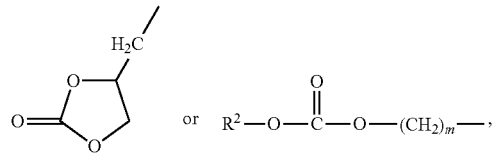

wherein m is 1 to 10 and $R^2$ is a $C_1$ to $C_{10}$ linear, branched or cyclic alkyl or aryl;
$M^+$ is $H^+$, $NH_4^+$, $Na^+$, $Li^+$, $Cs^+$, $K^+$, or mixtures thereof;
a is 20 to 80 mol %;
b is 5 to 80 mol %; and
c is 0 to 70 mol %;
wherein the sum of a+b+c is equal to 100%.

The present invention further comprises a method of treating a substrate comprising contacting said substrate with a copolymer of Formula I.

The present invention further comprises a substrate treated in accordance as the above mentioned method.

DETAILED DESCRIPTION

Herein, trademarks are shown in upper case.
The present invention comprises copolymers of formula (I)

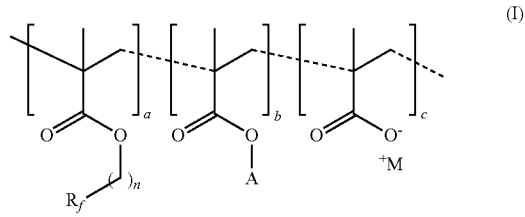

wherein
$R_f$ is $C_2$ to $C_{10}$ fluoroalkyl, optionally interrupted by one or more —O—, —$CH_2$—, —CFH—, or combinations thereof;
n is an integer from 1 to 10;
A is a linear, branched, or cyclic carbonate of formula

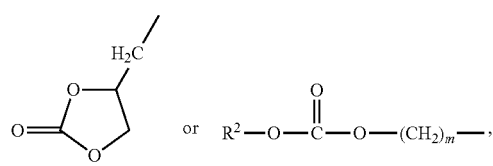

wherein m is 1 to 10 and $R^2$ is a $C_1$ to $C_{10}$ linear, branched or cynic alkyl or aryl;
$M^+$ is $H^+$, $NH_4^+$, $Na^+$, $Li^+$, $Cs^+$, $K^+$, or mixtures thereof;
a is 20 to 80 mol %;
b is 5 to 80 mol %; and
c is 0 to 70 mol %;
wherein the sum of a+b+c is equal to 100%.

In all embodiments of the present invention, a, b, and c represent the molar percentage of each individual component that is used to prepare the copolymers of the present invention. The copolymers of Formula I are present in a random order of monomers within the copolymer, represented by the dotted lines. The molar percentage of each reactant (a, b, and c) are chosen such that they are equal too any individual number within the previously specified molar range, and the sum of the combined components is equal to 100%. One skilled in the art can easily choose molar percentages for each monomer within the stated ranges so that the total equals 100%. For example, a is any of 20, 21, 22, 23 and so on, up to 80; b is 5, 6, 7, 8, and so on up to 80; and c is 0, 1, 2, 3, 4 and so on up to 70. The combination of any individual value for a from 20 to 80, any individual value for b from 5 to 80, and any individual value for c from 0 to 70, that totals 100 is included within the present invention.

In particular embodiments described below, a, b, and c are each equal to any individual value within the cited range for a, b, and c respectively and the invention includes any combination of the individual values for a, b, and c that total to 100.

In one embodiment, the present invention comprises copolymers of Formula I,

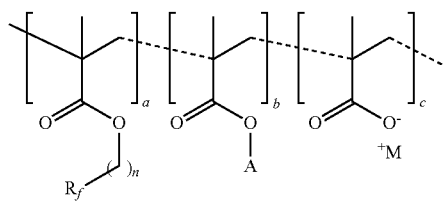

(I)

wherein
  $R_f$ is $C_2$ to $C_{10}$ fluoroalkyl, optionally interrupted by one or more —O—, —$CH_2$—, —CFH—, or combinations thereof;
  n is an integer from 1 to 10;
  A is a linear, branched, or cyclic carbonate of formula

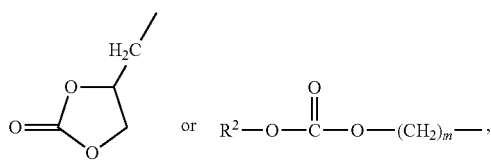

wherein m is 1 to 10 and $R^2$ is a $C_1$ to $C_{10}$ linear, branched or cyclic alkyl or aryl;
  $M^+$ is $H^+$;
  a is 20 to 80 mol %;
  b is 20 to 80 mol %; and
  c is 0 mol %.

For the first embodiment, $R_f$ is preferably $C_4$ to $C_8$ perfluoroalkyl, more preferably $R_f$ is $C_6$ perfluoroalkyl. Preferably n is 2 to 6, more preferably n is 2. Preferably a is 30 to 70 mol %, b is 30 to 70 mol % and c is 0 mol %, more preferably a is 40 to 60 mol %, b is 40 to 60 mol %, and c is 0 mol %, most preferably a is 50 mol %, b is 50 mol %, and c is 0 mol %. Preferably A is a cyclic carbonate cyclic carbonate of formula

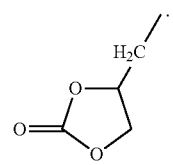

Preferably, A is a linear or branched carbonate of formula

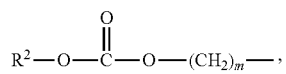

wherein m is 1 to 10 and $R^2$ is a $C_1$ to $C_{10}$. Preferably, A is a linear carbonate of formula

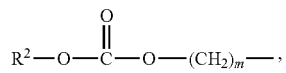

wherein m is 1 to 10 and $R^2$ is a $C_1$ to $C_{10}$. Preferably, A is a branched carbonate of formula

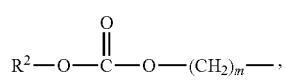

wherein m is 1 to 10 and $R^2$ is a $C_1$ to $C_{10}$. Preferably m is 2 to 8, more preferably, m is 2 to 6. Preferably $R^2$ is a $C_2$ to $C_8$, more preferably, $R^2$ is a $C_2$ to $C_6$.

In a second embodiment, the present invention comprises copolymers of formula (I)

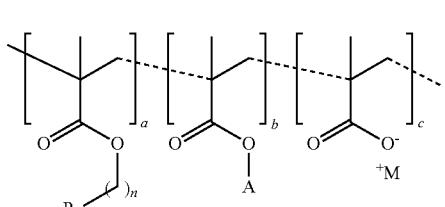

(I)

wherein
  $R_f$ is $C_2$ to $C_{10}$ fluoroalkyl, optionally interrupted by one or more —O—, —$CH_2$—, —CFH—, or combinations thereof;
  n is an integer from 1 to 10;
  A is a linear, branched, or cyclic carbonate of formula

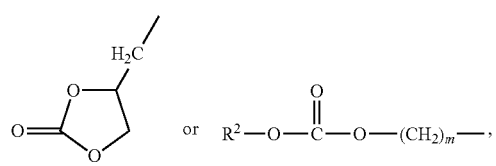

wherein m is 1 to 10 and $R^2$ is a $C_1$ to $C_{10}$ linear, branched or cyclic alkyl or aryl;

$M^+$ is $H^+$;

a is 20 to 60 mol %;

b is 5 to 50 mol %; and c is 25 to 70 mol %.

For the second embodiment, $R_f$ is preferably $C_4$ to $C_8$ perfluoroalkyl, more preferably $R_f$ is $C_6$ perfluoroalkyl. Preferably $M^+$ is $H^+$. Preferably n is 2 to 6, more preferably n is 2. Preferably a is 15 to 50 mol %, b is 15 to 40 mol % and c is 25 to 60 mol %, more preferably a is 30 to 45 mol %, b is 10 to 35 mol %, and c is 30 to 45 mol %. Preferably A is a cyclic carbonate cyclic carbonate of formula

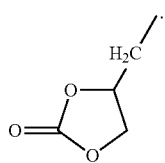

Preferably, A is a linear or branched carbonate of formula

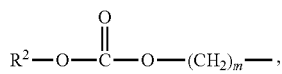

wherein m is 1 to 10 and $R^2$ is a $C_1$ to $C_{10}$. Preferably, A is a linear carbonate of formula

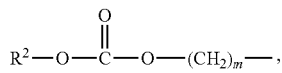

wherein m is 1 to 10 and $R^2$ is a $C_1$ to $C_{10}$. Preferably, A is a branched carbonate of formula

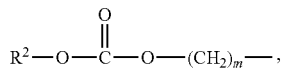

wherein m is 1 to 10 and $R^2$ is a $C_1$ to $C_{10}$. Preferably m is 2 to 8, more preferably, m is 2 to 6. Preferably $R^2$ is a $C_2$ to $C_8$, more preferably, $R^2$ is a $C_2$ to $C_6$.

In a third embodiment, the present invention comprises copolymers of formula (I)

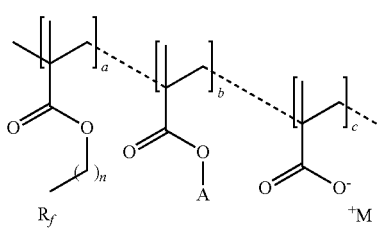

(I)

wherein $R_f$ is $C_2$ to $C_{10}$ fluoroalkyl, optionally interrupted by one or more —O—, —$CH_2$—, —CFH—, or combinations thereof;

n is an integer from 1 to 10;

A is a linear, branched, or cyclic carbonate of formula

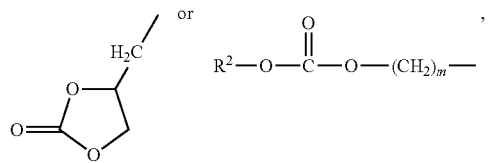

wherein m is 1 to 10 and $R^2$ is a $C_1$ to $C_{10}$ linear, branched or cyclic alkyl or aryl;

$M^+$ is $NH_4^+$, $Na^+$, $Li^+$, $Cs^+$, $K^+$, or mixtures thereof;

a is 20 to 60 mol %;

b is 5 to 50 mol %; and c is 25 to 70 mol %.

For the third embodiment, $R_f$ is preferably $C_4$ to $C_8$ perfluoroalkyl, more preferably $R_f$ is $C_6$ perfluoroalkyl. Preferably $M^+$ is $NH_4^+$. Preferably $M^+$ is $Na^+$. More preferably $M^+$ is a mixture of $NH_4^+$ and $Na^+$. Preferably n is 2 to 6, more preferably n is 2. Preferably a is 15 to 50 mol %, b is 15 to 40 mol % and c is 30 to 60 mol %, more preferably a is 30 to 45 mol %, b is 10 to 35 mol %, and c is 30 to 45 mol %. Preferably A is a cyclic carbonate cyclic carbonate of formula

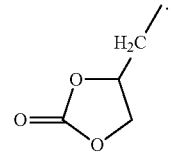

Preferably, A is a linear or branched carbonate of formula

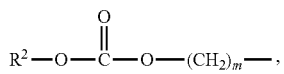

wherein m is 1 to 10 and $R^2$ is a $C_1$ to $C_{10}$. Preferably, A is a linear carbonate of formula

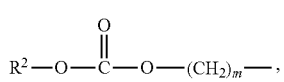

wherein m is 1 to 10 and $R^2$ is a $C_1$ to $C_{10}$. Preferably, A is a branched carbonate of formula

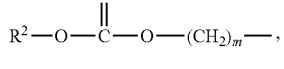

wherein m is 1 to 10 and $R^2$ is a $C_1$ to $C_{10}$. Preferably m is 2 to 8, more preferably, m is 2 to 6. Preferably $R^2$ is a $C_2$ to $C_8$, more preferably, $R^2$ is a $C_2$ to $C_6$.

In all embodiments of the present invention, a, b, and c represent the molar percentage of each individual component that is used to prepare the copolymers of the present invention. The molar percentage of each reactant (a, b, and c) are chosen such that they within the previously specified molar range and the sum of the combined components is equal to 100%. One skilled in the art can easily choose molar percentages for each monomer within the stated ranges so that the total equals 100%.

Copolymers of the present invention are prepared by radical polymerization by contacting fluorinated methacrylate monomers, carbonate methacrylate monomers, and optionally methacrylate acid monomers or salts thereof together in the presence of a radical initiator.

Copolymers of Formula I are prepared via polymerization and are carried out in the presence of one or more radical initiators. The radical initiators are present at 0.1 to 2.0 weight percent relative to the weight of the monomers employed. Initiators which may be used are peroxides such as, for example, benzoyl peroxide, lauroyl peroxide, succinyl peroxide and tert-butyl perpivalate, or azo compounds such as 2,2'-azobisisobutyronitrile, 4,4'-azobis(4-cyanopentanoic acid) and azodicarbonamide. Such azo initiators are commercially available from E.I. du Pont de Nemours and Company, Wilmington, Del., under the name of "VAZO" 67, 52 and 64, and by Wako Pure Industries, Ltd., Osaka, Japan, under the name "V-501". The process may also be performed in the presence of UV radiation and photo-initiators such as benzophenone, 2-methylanthraquinone or 2-chlorothioxanthone.

The reaction temperature varies within a wide range, that is to say between room temperature and the boiling point of the reaction mixture. The process is preferably performed between about 50° C. and about 90° C., more preferably at 60 to 80° C.

For copolymers of the third embodiment wherein $M^+$ is $NH_4^+$, $Na^+$, $Li^+$, $Cs^+$, $K^+$, or mixtures thereof, the salt is formed by added the respective base to the polymerized polymer. For example, to form copolymers of Formula I wherein $M^+$ is $NH_4$, one mole equivalent of ammonia is added to the reaction relative to the moles of methacrylate acid monomer used. For copolymers wherein $M^+$ is $K^+$, one mole equivalent or more of potassium hydroxide is added. Examples of suitable bases include, but not limited to, ammonia, ammonium hydroxide, sodium hydroxide, lithium hydroxide, cesium hydroxide potassium hydroxide, or mixtures thereof.

The fluorinated methacrylate monomers used to prepare copolymers of Formula I are of formula (II)

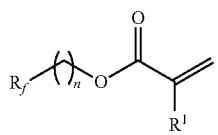

(II)

wherein $R_f$ is $C_2$ to $C_{10}$ fluoroalkyl, optionally interrupted by one or more —O—, —$CH_2$—, —CFH—, or combinations thereof, n is an integer from 1 to 10, and $R^1$ is H or $CH_3$. Examples of $R_f$ include, but are not limited to, $CF_3(CF_2)_x$—, $CF_3(CF_2)_x(CH_2CF_2)_y$—, $CF_3(CF_2)_yO(CF_2)_y$—, and $CF_3(CF_2)_yOCFH(CF_2)_z$—, wherein each x is independently 1 to 9, each y is independently 1 to 3, and each z is independently 1 to 4. Preferably, $R_f$ is $C_4$ to $C_8$ fluoroalkyl, more preferably, $R_f$ is $C_6$ fluoroalkyl. Preferably, n is 2 to 6, more preferably n is 2.

Fluorinated (meth)arcylates of Formula (II), are synthesized from the corresponding alcohols. These fluorinated methacrylate compounds are prepared by either esterification of the corresponding alcohol with acrylic acid or methacrylic acid or by transesterification with methyl acrylate or methyl methacrylate. These preparations are well known and are described in U.S. Pat. No. 3,282,905, herein incorporated by reference.

Fluorinated (meth)arcylates useful in the present invention are prepared from alcohols having the formula $CF_3(CF_2)_x(CH_2)_nOH$ wherein each x is individually 1 to 9 and n is an integer from 1 to 10, are commercially available from E.I. du Pont de Nemours and Company, Wilmington, Del. These alcohols are also be prepared by reaction of the corresponding perfluoroalkyl iodies with oleum and hydrolyzed according to the procedure described in WO 95/11877, herein incorporated by reference. These alcohols are available as a homologue distribution mixture or are fraction distilled into individual chain lengths.

Fluorinated (meth)acrylates useful in the present invention are prepared from alcohols having the formula $CF_3(CF_2)_x(CH_2CF_2)_p(CH_2)_nOH$ wherein each x is independently 1 to 4, each p is independently 1 to 2, and n is an integer from 1 to 10. These alcohols are prepared by the telomerization of perfluoroalkyl iodides with vinylidene fluoride followed by ethylene insertion. A detailed description of the vinylidene fluoride reaction is described in Balague, et al., "Synthesis of Fluorinated telomers, Part 1, Telomerization of vinylidene fluoride with perfluoroalkyl iodides", J. Fluor. Chem. (1995), 70(2), 215-23. Reaction details for the ethylene insertion reaction are described in U.S. Pat. No. 3,979,469. The alcohols are prepared with oleum and hydrolysis as described above.

Fluorinated (meth)arcylates useful in the present invention are prepared from alcohols having the formula $CF_3(CF_2)_yO(CF_2)_y(CH_2)_nOH$ wherein each y is independently 1 to 3 and n is an integer of 1 to 10. These alcohols are prepared from the corresponding perfluoroalkyl ether iodides, of formula $CF_3(CF_2)_yO(CF_2)_yI$ wherein each y is independently 1 to 3. These iodides are prepared according to the procedure described in U.S. Pat. No. 5,481,028, hereby incorporated by reference, by reacting a perfluorovinyl ether with ICl/HF and $BF_3$. Ethylene insertion and alcohol conversion is as described above.

The carbonate methacrylate monomers used to prepare copolymers of Formula I are of formula II

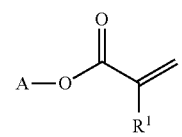

(II)

wherein A is a linear, branched, or cyclic carbonate and $R^1$ is H or $CH_3$. Preferably, A is a carbonate of formula

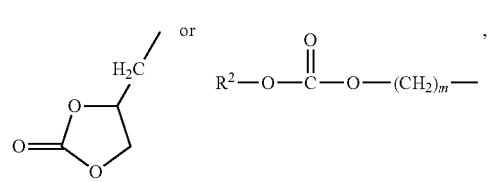

wherein m is 1 to 10 and $R^2$ is a $C_1$ to $C_{10}$ linear, branched or cyclic alkyl or aryl. These carbonates useful in the present invention are prepared by reacting an organic carbonates containing an alcohol group with (meth)acryloyl chloride in the presence of a halogen acceptor, such as an amine. Alternatively, alkyl chloroformate are reacted with hydroxyalkyl acrylates in the presence of a halogen acceptor. Synthesis of carbonates useful in the present invention are described by Chen, in U.S. Pat. No. 4,344,982. Synthesis of cyclic carbonates useful in the present invention are described by D'Alelio et al, in "Preparation and Polymerization of Some Vinyl Monomers Containing the 2-oxo-1,3-Dioxolane Group" Journal of Polymer Science: Part A-1 (1967), Vol. 5, 307-321.

The copolymers of Formula I are preferably in the form of a dispersion. It is typically employed as a solvent dispersion or an aqueous dispersion. For the first embodiment, copolymers of Formula I wherein a is 20 to 80 mol %, b is 20 to 80 mol %, and c is 0 mol %, the dispersions are preferably prepared in organic solvents, such as tetrahydrofuran, or as an aqueous dispersion. In the second embodiment, wherein $M^+$ is H, a is 20 to 60 mol %; b is 5 to 50 mol %; and c is 25 to 70 mol %, the dispersions are preferably prepared in organic solvents, such as tetrahydrofuran, or as an aqueous dispersion with one or more surfactants. For the third embodiment, wherein $M^+$ is $NH_4^+$, $Na^+$, $Li^+$, $Cs^+$, or $K^+$, or mixtures thereof, a is 20 to 60 mol %; b is 5 to 50 mol %; and c is 25 to 70 mol %, dispersions are preferably prepared in water.

Surfactants useful in the present invention, such as in the first and second embodiments, are any of those surfactants commonly used to prepare aqueous dispersions. Examples of suitable surfactants are methyl chloride salt of an ethoxylated alkyl amine salt, such as an 18-carbon alkylamine with 15 moles of ethylene oxide and condensation products of ethylene oxide with $C_{12}$ to $C_{18}$ fatty alcohols; $C_{12}$ to $C_{18}$ fatty acids; alkyl phenols having 8 to 18 carbon atoms in the alkyl group; $C_{12}$ to $C_{18}$ alkyl thiols and $C_{12}$ to $C_{18}$ alkyl amines. Preferred examples of suitable surfactants are commercially available as ETHOQUAD 18/25 available from Akzo Nobel, Chicago, Ill. and as TWEEN 20, available from Sigma Aldrich, St. Louis, Mo.

The present invention further comprises a method of treating a substrate to provide stain resistance, oil and water repellency comprising contacting the substrate surface with a copolymer of Formula I. The copolymers of the present invention are in the form of an organic dispersion or an aqueous dispersion and can optionally contain one or more surfactants. The dispersions are added alone or can optionally include additives or treatment agents. The copolymers of the present invention are applied to substrates by known means, including but not limited to, brushing, spraying, rollering, dipping, padding, doctor blade, wipe, dip techniques, and wet-on-wet procedure. Those skilled in the art understand that the type of substrate; i.e., hard surface or textile, will determine the appropriate mode of application. For example, for a hard surface such as tile, application of copolymers are applied by brushing or spraying. For fibrous substrates, such as cottons or nylons, padding or dipping are chosen to apply the copolymers to the substrate.

The present invention further comprises one or more substrates treated according to the method of the present invention. These substrates comprise hard surface substrates or fibrous substrates. Examples of hard surface substrates include, but are not limited to, unglazed concrete, brick, tile, stone such as limestone and saltillo, grout, mortar, composite materials such as terrazzo, wall and ceiling panels including those fabricated with gypsum board, marble, statuary, monuments, and wood. Suitable fibrous substrates include, but are not limited to, woven and nonwoven fibers, yarns, fabrics, fabric blends, textiles, nonwovens, paper, leather, rugs and carpets. These are made from natural or synthetic fibers including cotton, cellulose, wool, silk, polyamide, polyester, polyolefin, polyacrylonitrile, polypropylene, rayon, nylon, aramid, and acetate. The treated substrates have improved repellency to water, oil and greases and provide protection against staining.

The copolymers, methods, and treated substrates of the present invention are useful in providing stain resistance and water and oil repellency to a variety of substrates The copolymers are easily adaptable for a variety of applications and are used as organic or aqueous dispersions and optionally contain one or more surfactants. The copolymers also provide stain resistance after washing cycles.

EXAMPLES

Materials and Test Methods

Cyclic Carbonate Methacrylate Preparation

A cyclic carbonate methacrylate, 2-methyl acrylic acid 2-oxo-[1,3]-dioxolan-4-ylmethyl ester, was prepared by reacting 4-hydroxymethyl-1,3-dioxolan-one (10.164 g, 84 mmol, commercially available from SigmaAldrich, St. Louis, Mo.), triethylamine (9.27 g, 92 mmol), and ethyl acetate (100 mL) in a three-neck flask equipped with a magnetic stir bar and was purged constantly by nitrogen. The flask was immersed in an ice water bath to maintain the reaction temperature below 5° C. Methacryloyl chloride solution (9.445 g, 91 mol in 20 mL acetate) was slowly added to the reaction mixture over an hour and a half, and methoxy phenyl (0.002 grams) was added and reacted overnight at room temperature. The resulting product (triethylamine salt) was subsequently removed via vacuum assisted filtration. The resultant product was washed three times with saturated sodium bicarbonate solution, three times with 1 wt % aqueous hydrochloric acid solution, and three times with saturated sodium chloride solution, followed by drying overnight over sodium sulfate. After the sodium sulfate was removed via vacuum assisted filtration, the solvent was removed via rotary evaporation to give 2-methyl acrylic acid 2-oxo-[1,3]-dioxolan-4-ylmethyl ester (12.4 g, 67 mmol). This cyclic carbonate methacryalte was used to prepare the following examples 1 though 8.

Linear Carbonate Methacrylate Preparation

ω-Methoxycarbonyloxyethyl methacrylate monomer was prepared according to Example 17a in Fischer and Eisenbach, in Makromol Chem., Rapid Commun. 9, 503-511 by reacting 2-hydroxyethylmethacrylate (10 g, 76.8 mmol), methyl chloroformate (10.89 g, 115.2 mmol) and Triethyl amine (8.78 g, 86.8 mmol in 100 mL methylene chloride at −70° C. under nitrogen. The reaction mixture was warmed to room temperature overnight. The reaction mixture was then diluted with additional methylene chloride and washed with water, followed by washes of hydrochloric acid (1 N), sodium carbonate (1 N), and water again. The resulting mixture, ω-methyloxycarbonyloxyethyl methacrylate along with unreacted 2-hydroxylethylmethacrylate (9.35 g) was used to prepare example 9.

Application and Testing of Polymers on Stone Tile Surface

The copolymers of the present invention were applied as dispersions and tested on limestone and saltillo stone tiles. The stone tiles are wiped with a damp SONTARA wipe (commercially available from E.I. du Pont de Nemours and Company, Wilmington, Del.). The stones dried overnight at room temp and sectioned into 9 equal segments by adhesive tape. The copolymers of the present invention were applied as dispersions to each section using a bristle brush. The amount of polymer applied was determined by taking the weight difference of the polymer stock solution before and after application. Each section was brushed with a dispersion to form one even coat. Typically four main brush passes were used to cover the surface. After 15 minutes, any excess copolymer on the surface, was removed by buffing the surface with a wipe. The coating was allowed to dry overnight and then performance was evaluated by the test methods described below.

Application onto Textile Fabrics:

Textile fabric was treated with the fluorinated polymer solutions using the following process. Polymer solutions were prepared in tetrahydrofuran to contain 2000 mg/kg of fluorine. The solutions were applied to fabric substrates by pipetting the polymer solution onto substrates to saturation. After application, the substrate was dried in air and cured at approximately 150° C. for about 2 minutes. The substrate was allowed to cool to room temperature then performance evaluated by the test methods described below.

Washability Testing

The washability of the copolymers of the present invention was tested on tiles to evaluate the copolymers ability to retain satin resistance and oil and water repellency after cleaning. The treated tiles were tested according to the 24-Hour Stain Testing listed below for stain resistance. The treated tiles were first washed with water and scoured with a sponge wrapped in nylon netting for ten passes, rinsed with plain water and allowed to dry for 24 hours and tested for stain resistance. In a separate section of the tile, the treated tile was washed with soap and water and scoured with a sponge wrapped in nylon netting for ten passes, rinsed with plain water and allowed to dry for 24 hours and tested for stain resistance.

Test Method 1. Water and Oil Beading Test

Individual drops of water and vegetable oil (approximately 4 to 5 mm in diameter or 0.04 to 0.05 mL volume) were placed on the coated surface using a glass pipette. The drop was allowed to sit on the surface for five minutes and the degree of beading (i.e., contact angle) was visually determined. The degree of beading is rated from 0 to 5 as shown in the Table 1 below. Higher ratings are indicative in superior repellency performance.

TABLE 1

Water and Oil Contact Angle Measurments

| Rating | Contact angle (°) | Significance |
| --- | --- | --- |
| 0 | <10 | Penetration of liquid |
| 1 | 10 to 25 | Poor Beading |
| 2 | 25 to 45 | Fair Beading |
| 3 | 45 to 75 | Good Beading |
| 4 | 75 to 90 | Very good Beading |
| 5 | 90 to 120 | Excellent Beading |

Test Method 2. 24-Hour Stain Testing:

One drop each of common household stains (mustard, ketchup, vegetable oil, coffee) were individually placed on the treated tile surface and allowed to sit for 24 hours. The stains were removed by washing with water and a nylon bristle brush. The treated stone was allowed to dry at room temperature (72 to 78° F.) until the stone was completely dry (approximately 12 to 24 hours). The stain residue remaining on the tile surface was visually rated from 0 to 4 as follows. Liquid stains that does not leave a visible surface stain but penetrates deep into the substrate are given a rating 4. Lower rating indicates better performance. The stain procedure was repeated 4 times and averaged.

TABLE 2

24-Hour stain ratings

| Rating | Visual Observation |
| --- | --- |
| 0 | No stain |
| 1 | Very light stain |
| 2 | Light stain |
| 3 | Moderate stain |
| 4 | Heavy stain<br>Or<br>Penetration of liquid stain deep into the substrate |

A stain score aggregate is calculated by adding the sum of all stain scores for a test sample and the performance compared with the total maximum possible score (i.e., for 4 stains, the highest rating is 16).

Test Method 3—Water Repellency Test

The water repellency of treated stone tile substrates and fibrous substrates was measured according to AATCC (American Association of Textile Chemists and Colorists) standard Test Method No. 193-2004. The test determined the resistance of the treated substrate to wetting by aqueous test solutions (see Table 3 for Test Solution copolymers). Drops of test solutions (approximately 5 mm in diameter or 0.05 mL volume) of water-alcohol mixtures of varying surface tensions were placed on the treated substrate and the extent of surface wetting was determined visually. Three drops of test solution #1 were placed on the substrate. After ten seconds, the drops were removed by using vacuum aspiration. If no liquid penetration or partial absorption (appearance of a darker wet patch on the substrate) was observed, the test was repeated with Test Liquid 2 and with progressively higher Test Liquid numbers until liquid penetration (appearance of a darker wet patch on the substrate) was observed. The rating was the highest Test Liquid number that did not penetrate into the substrate. Higher scores indicate greater water repellency and superior performance.

The composition of water repellency test liquids is shown in the Table 3 below.

TABLE 3

| Test Solution # | Composition, Volume % | | Rating Number |
| --- | --- | --- | --- |
| | Isopropyl Alcohol | Distilled Water | |
| 1 | 2 | 98 | 1 |
| 2 | 5 | 95 | 2 |
| 3 | 10 | 90 | 3 |
| 4 | 20 | 80 | 4 |
| 5 | 30 | 70 | 5 |
| 6 | 40 | 60 | 6 |
| 7 | 50 | 50 | 7 |
| 8 | 60 | 40 | 8 |
| 9 | 70 | 30 | 9 |
| 10 | 80 | 20 | 10 |
| 11 | 90 | 10 | 11 |
| 12 | 100 | 0 | 12 |

Test Method 4. Oil Repellency Test

The oil repellency of treated stone tile substrates and fibrous substrates was tested using a modification of AATCC standard Test Method No. 118, and was modified as follows. A series of organic liquids, identified below in the Table 4, were applied drop wise to the substrate. Beginning with the lowest numbered test liquid (Repellency Rating No. 1), one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids results in two of the three drops failed to remain spherical to hemispherical, or wetting or wicking occurs.

The oil repellency rating was the highest numbered test liquid for which two of the three drops remained spherical to hemispherical, with no wicking for 30 seconds. Higher scores indicate greater oil repellency.

TABLE 4

| Rating Number | Test Solution |
|---|---|
| 0 | Fails NUJOL* Purified Mineral Oil |
| 1 | NUJOL* Purified Mineral Oil |
| 2 | 65/35 Nujol ®/n-hexadecane by volume at 21 C |
| 3 | n-hexadecane |
| 4 | n-tetradecane |
| 5 | n-dodecane |
| 6 | n-decane |
| 7 | n-octane |
| 8 | n-heptane |

*NUJOL (comercially available from Plough, Inc. Memphis, Tennesse) is a mineral oil having a Saybolt viscosity of 360/390 at 38° C. and a specific gravity of 0.880/0.900 at 15° C.

EXAMPLES

Example 1

A copolymer of Formula I was prepared in organic solvent. Perfluoroalkyl methacrylate, having the formula $CF_3(CF_2)_5CH_2CH_2OC(O)C(CH_3)\!\!=\!\!CH_2$ (2.846 g, 6.59 mmol, commercially available from E.I. du Pont de Nemours and Company, Wilmington, Del.), 2-methyl acrylic acid 2-oxo-[1,3]-dioxolan-4-ylmethyl ester monomer (2.02 g, 10.86 mmol), and tetrahydrofuran (THF, 25 g) were added to a nitrogen purged reaction vessel equipped with a magnetic stir bar and condenser. The reaction vessel was then purged with nitrogen at room temperature (approximately 23° C.) for one hour. The reaction vessel was then placed in a heated bath at 60° C. and initiator (0.125 g, 0.65 mmol, VAZO 67, commercially available from E.I. du Pont de Nemours and Company, Wilmington, Del.) was added to the reaction flask using a syringe. The temperature of the reaction vessel was raised to 68° C. and held at 68° C. for 16 hours. The molar concentration of the individual monomers are listed in Table 5. The reaction product was cooled and applied to saltillo, limestone, cotton, and nylon substrates and tested according to the methods described above.

Example 2

A copolymer of Formula I was prepared in water with surfactants.

Perfluoroalkyl methacrylate, having the formula $CF_3(CF_2)_5 CH_2CH_2OC(O)C(CH_3)\!\!=\!\!CH_2$ (1.01 g, 2.34 mmol), 2-methyl acrylic acid 2-oxo-[1,3]-dioxolan-4-ylmethyl ester monomer (0.751 g, 4.038 mmol), D.I. water (18.18 g) surfactants (Tween 20, 0.546 g and ethoquad 18/25, 1.272 g) were added to a nitrogen purged reaction vessel equipped with a magnetic stir bar and condenser. The reaction vessel was then purged with nitrogen at room temperature (approximately 23° C.) for one hour. The reaction vessel was then placed in a heated bath at 60° C. and an aqueous solution of initiator (0.044 g, VAZO 56, commercially available from E.I. du Pont de Nemours and Company, Wilmington, Del.) was added to the reaction flask using a syringe. The temperature of the reaction vessel was raised to 56° C. and held for 16 hours. The molar concentration of the individual monomers are listed in Table 5. The reaction product was cooled and applied to saltillo, limestone, cotton, and nylon substrates and tested according to the methods described above.

Example 3

A copolymer of Formula I was prepared in an organic solvent wherein $M^+$ is H. Perfluoroalkyl methacrylate, having the formula $CF_3(CF_2)_5CH_2CH_2OC(O)C(CH_3)\!\!=\!\!CH_2$ (2.79 g, 6.45 mmol), 2-methyl acrylic acid 2-oxo-[1,3]-dioxolan-4-ylmethyl ester monomer (1.0 g, 5.37 mmol), methylacrylic acid (0.462 g, 5.37 mmol) and THF (20 g) were added to a nitrogen purged reaction vessel equipped with a magnetic stir bar and condenser. The reaction vessel was then purged with nitrogen at room temperature (approximately 23° C.) for one hour. The reaction vessel was then placed in a heated bath at 60° C. and a THF (1 mL) solution initiator (0.121 g, 0.63 mmol, VAZO 67, commercially available from E.I. du Pont de Nemours and Company, Wilmington, Del.) was added to the reaction flask using a syringe. The temperature of the reaction vessel was raised to 68° C. and held at 68° C. for 16 hours. The molar concentration of the individual monomers are listed in Table 5. The reaction product was cooled and applied to saltillo, limestone, cotton, and nylon substrates and tested according to the methods described above.

Examples 4 and 5

Copolymers of Formula I was prepared in organic solvent, wherein $M^+$ is $H^+$. The procedure of Example 3 was repeated for Examples 4 and 5 with varying amounts of perfluoroalkyl methacrylate, cyclic carbonate methacrylate, and methacylic acid in THF. The reaction product was cooled and applied to saltillo, limestone, cotton, and nylon substrates and tested according to the methods described above.

Example 6, 7, and 8

Examples 6, 7, and 8, copolymers of Formula I, wherein $M^+$ is $NH_4^+$, were prepared by the following procedure with the molar concentration of the individual monomers are listed in Table 5 for each Example.

Perfluoroalkyl methacrylate, having the formula $CF_3 (CF_2)_5 CH_2CH_2OC(O)C(CH_3)\!\!=\!\!CH_2$ (2.79 g, 6.45 mmol), 2-methyl acrylic acid 2-oxo-[1,3]-dioxolan-4-ylmethyl ester monomer (1.0 g, 5.37 mmol), methylacrylic acid (0.462 g, 5.37 mmol) and THF (20 g) were added to a nitrogen purged reaction vessel equipped with a magnetic stir bar and condenser. The reaction vessel was then purged with nitrogen at room temperature (approximately 23° C.) for one hour. The reaction vessel was then placed in a heated bath at 60° C. and a THF (1 mL) solution initiator (0.121 g, 0.63 mmol, VAZO 67, commercially available from E.I. du Pont de Nemours and Company, Wilmington, Del.) was added to the reaction flask using a syringe. The temperature of the reaction vessel was raised to 68° C. and held at 68° C. for 16 hours. A warm solution mmonium hydroxide (0.394 g (6.5 mmol), 28 wt % $NH_3$) in water (25 g) was added to the reaction mixture at 60 C and stirring continued at 60 C for 45 minutes. THF was then removed by distillation under vacuum and the resulting dispersion was diluted with water to obtain the desired concentration. The diluted dispersion was applied to saltillo and limestone substrates and tested according to the methods described above.

TABLE 5

Molar concentration of monomers and solvent selection

| Examples | Perfluoroalkyl methacrylate (mol %) | Cyclic carbonate methacrylate (mol %) | Methacrylic acid or salt (mol %) | Solvent |
|---|---|---|---|---|
| 1 | 38 | 62 | 0 | THF |
| 2 | 38 | 62 | 0 | Water/Surfactants |
| 3 | 37 | 32 | 31 | THF |
| 4 | 46 | 18 | 36 | THF |
| 5 | 47 | 9 | 44 | THF |
| 6 | 37 | 32 | 31 | Water |
| 7 | 46 | 18 | 36 | Water |
| 8 | 47 | 9 | 44 | Water |

Example 9

A copolymer of Formula I was prepared in an organic solvent wherein M is $NH_4^+$. Perfluoroalkyl methacrylate, having the formula $CF_3(CF_2)_5CH_2CH_2OC(O)C(CH_3)=CH_2$ (11.15 g, 25.8 mmol), ω-methyloxycarbonyloxyethyl methacrylate/hydroxymethylmethacrylate monomer (1.445 g, 7.7 mmol), hydroxyethyl mathacrylate (0.619 g, 4.8 mmol) and methylacrylic acid (2.46 g, 28.6 mmol) in THF (75 g) were added to a nitrogen purged reaction vessel equipped with a magnetic stir bar and condenser. The reaction vessel was then purged with nitrogen at room temperature (approximately 23° C.) for one hour. The reaction vessel was then placed in a heated bath at 60° C. and a THF (2 mL) solution of the initiator (0.6 g, 0.293 mmol, VAZO 67, commercially available from E.I. du Pont de Nemours and Company, Wilmington, Del.) was added to the reaction flask using a syringe. The temperature of the reaction vessel was raised to 68° C. and held at 68° C. for 16 hours to obtain the copolymer solution in THF. 21.5 g of the polymer solution in THF (~30% wt % in polymer in THF) was transferred to a neutralization reactor and heated to 60° C. A warm solution mmonium hydroxide (0.432 g (7.151 mmol), 28 wt % $NH_3$) in water (25 g) was added to the reaction mixture at 60° C. and stirring continued at 60° C. for 45 minutes. THF was then removed by distillation and the resulting dispersion was diluted with water to obtain the desired concentration. The diluted dispersion was applied to saltillo and limestone substrates and tested according to the methods described above.

Examples 1 though 9 were applied to saltillo and limestone surfaces and tested according to Test Method 1, Oil and Water Beading, Test Methods 3, Water repellency, and Test Method 4, Oil Repellency according to the methods as described in above. Untreated saltillo and limestone were also tested as a comparison. Results are listed below in Table 6 for Oil and Water Beading, Table 7 for Test Methods 3 and 4.

TABLE 6

Stone and Tile Oil and Water Beading Scores
(rating 0 to 5, 5 is best)

| | Oil | | Water | |
|---|---|---|---|---|
| Examples | Saltillo | Limestone | Saltillo | Limestone |
| Untreated | 0 | 0 | 0 | 0 |
| 1 | 4 | 5 | 4 | 5 |
| 2 | 0 | 5 | 0 | 4 |

TABLE 6-continued

Stone and Tile Oil and Water Beading Scores
(rating 0 to 5, 5 is best)

| | Oil | | Water | |
|---|---|---|---|---|
| Examples | Saltillo | Limestone | Saltillo | Limestone |
| 3 | 4 | 5 | 4 | 5 |
| 4 | 4 | 4 | 4 | 4 |
| 5 | 4 | 4 | 5 | 5 |
| 6 | 4 | 5 | 4 | 5 |
| 7 | 4 | 4 | 2 | 2 |
| 8 | 4 | 4 | 4 | 2 |
| 9 | 3 | 3 | 3 | 3 |

TABLE 7

Stone and Tile Teflon Kit Test Scores (Oil: 0-8,
8 is best Water: rating 0-12, 12 is best)

| | Oil | | Water | |
|---|---|---|---|---|
| Examples | Saltillo | Limestone | Saltillo | Limestone |
| Untreated | 0 | 0 | 0 | 0 |
| 1 | 7 | 7 | 12 | 12 |
| 2 | 0 | 8 | 0 | 9 |
| 3 | 6 | 6 | 10 | 9 |
| 4 | 6 | 8 | 11 | 12 |
| 5 | 7 | 8 | 11 | 12 |
| 6 | 6 | 6 | 10 | 9 |
| 7 | 8 | 8 | 5 | 12 |
| 8 | 8 | 8 | 11 | 12 |
| 9 | 8 | 12 | 3 | 8 |

All of the examples performed well for oil and water beading, oil and water repellency for limestone substrates when compared to untreated stone. Examples 1, 3 through 9 performed well for saltillo for oil and water beading, oil and water repellency compared to untreated stone.

The examples were applied to saltillo and limestone tiles and then were tested for staining according to Test Method 2 as described above. Results are listed in Tables 8 for saltillo and Table 9 for limestone.

TABLE 8

Stain Scoring (rating 0-4, 0 best, 4 worst
or represent deep stain penetration), Saltillo

| Examples | Mustard | Ketchup | Veg. Oil | Coffee | Total |
|---|---|---|---|---|---|
| Untreated | 3 | 3 | 4 | 4* | 14 |
| 1 | 2 | 0.5 | 0 | 1 | 3.5 |
| 2 | 2 | 0.5 | 4 | 0.25 | 6.75 |
| 3 | 1 | 2 | 0 | 2 | 5 |
| 4 | 1 | 1 | 0 | 2 | 4 |
| 5 | 1.75 | 0 | 0 | 2 | 3.75 |
| 6 | 1 | 2 | 0 | 2 | 5 |
| 7 | 2 | 3 | 0 | 1 | 6 |
| 8 | 1 | 2 | 1 | 1 | 5 |
| 9 | 1 | 1 | 0 | 1 | 3 |

*represent deep penetration of stain to the substrate

TABLE 9

Stain Scoring (rating 0-4, 0 best, 4 worst or represent deep stain penetration), Limestone

| Examples | Mustard | Ketchup | Veg. Oil | Coffee | Total |
|---|---|---|---|---|---|
| Untreated | 3 | 3 | 4 | 3 | 13 |
| 1 | 0.5 | 1 | 0 | 0 | 1.5 |
| 2 | 2 | 0.5 | 0 | 0 | 2.5 |
| 3 | 0 | 1.25 | 0 | 0 | 1.25 |
| 4 | 2 | 0.5 | 0 | 0.5 | 3 |
| 5 | 2 | 1.5 | 0 | 0.5 | 4 |
| 6 | 3 | 0 | 0 | 1 | 4 |
| 7 | 3 | 0 | 0 | 0 | 3 |
| 8 | 4 | 0 | 0 | 0 | 4 |
| 9 | 1 | 2 | 0 | 1 | 5 |

Examples 1 though 9 performed well compared when applied to saltillo and limestone compared to untreated tiles. In some cases, the stains left no visible mark, such as for vegetable oil and coffee on limestone substrates.

Example 1 through 5 were applied to cotton and nylon samples and tested according to Test Methods 3 and 4 for oil and water repellency. Results are listed in Table 10.

TABLE 10

Oil and Water Repellency Ratings (rating 0-12, 12 is best)

| | Oil | | Water | |
|---|---|---|---|---|
| Examples | Cotton | Nylon | Cotton | Nylon |
| Untreated | 0 | 0 | 0 | 0 |
| 1 | 6 | 6 | 10 | 9 |
| 2 | 1 | 0 | 1 | 1 |
| 3 | 6 | 5 | 9 | 10 |
| 4 | 6 | 7 | 11 | 11 |
| 5 | 5 | 6 | 9 | 10 |

Examples 1, 3 though 5 performed well on the two fibrous substrates tested compared to untreated substrates.

TABLE 11

Stain Scoring after Wash Testing on Limestone

| | Stain | Unwashed | Water Washed | Soap and Water Washed |
|---|---|---|---|---|
| Example 4 | | | | |
| | Mustard | 1 | 2 | 3 |
| | Ketchup | 0 | 0 | 0 |
| | Red Wine | 1 | 2 | 2 |
| | Coffee | 0 | 1 | 0 |
| | Blue Ink | 2 | 2 | 3 |
| Untreated | | | | |
| | Mustard | 3 | 3 | 3 |
| | Ketchup | 2 | 2 | 2 |
| | Red Wine | 3 | 3 | 3 |
| | Coffee | 3 | 3 | 3 |
| | Blue Ink | 4 | 4 | 4 |

Limestone tile was treated by a copolymer of Example 4 and was tested for stain resistance 1) before washing, 2) after washing with water and 3) after washing with soap and water. Example 4 performed well for stain resistance on Limestone after water washing with water. The stain resistance was better than untreated after soap and water washing in all stains except mustard.

What is claimed is:

1. A composition comprising formula (I)

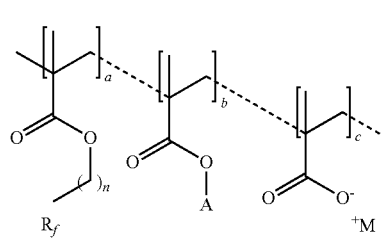

wherein
$R_f$ is $C_2$ to $C_{10}$ fluoroalkyl, optionally interrupted by one or more —O—, —CH$_2$—, —CFH—, or combinations thereof;
n is an integer from 1 to 10;
A is a linear, branched, or cyclic carbonate of formula

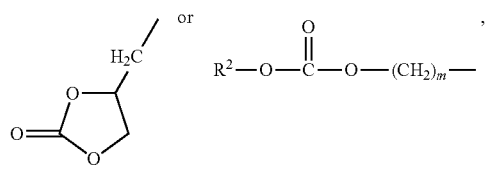

wherein m is 1 to 10 and $R^2$ is a $C_1$ to $C_{10}$ linear, branched or cylic alkyl or aryl;
$M^+$ is $H^+$, $NH_4^+$, $Na^+$, $Li^+$, $Cs^+$, $K^+$, or mixtures thereof;
a is 20 to 80 mol %;
b is 5 to 80 mol %; and
c is 0 to 70 mol %;
wherein the sum of a+b+c is equal to 100%.

2. A composition of claim 1, wherein a is 20 to 80 mol %; b is 20 to 80 mol %; and c is 0 mol %.

3. A composition of claim 2, wherein $R_f$ is $C_4$ to $C_8$, n is 2 to 6, a is 35 to 60 mol %, b is 40 to 70 mol % and c is 0 mol %.

4. A composition of claim 1, wherein $M^+$ is H, a is 20 to 60 mol %; b is 5 to 50 mol %; and c is 25 to 70 mol %.

5. A composition of claim 4, wherein $R_f$ is $C_4$ to $C_8$, n is 2 to 6, a is 30 to 45 mol %, b is 10 to 35 mol %, and c is 30 to 45 mol %.

6. A composition of claim 1, wherein $M^+$ is $NH_4^+$, $Na^+$, $Li^+$, $Cs^+$, $K^+$, or mixtures thereof, a is 20 to 60 mol %; b is 5 to 50 mol %; and c is 25 to 70 mol %.

7. A composition of claim 6, wherein $R_f$ is $C_4$ to $C_8$, n is 2 to 6, a is 30 to 45 mol %, b is 10 to 35 mol %, and c is 30 to 45 mol %.

8. A composition of claim 1, wherein the composition is in the form of a dispersion.

9. A composition of claim 2 wherein the composition is in the form of an organic dispersion.

10. A composition of claim 4 wherein the composition is in the form of an organic dispersion.

11. A composition of claim 6 wherein the composition is in the form of an aqueous dispersion.

12. A method of providing water repellency, oil repellency and stain resistance to a substrate surface comprising contacting the substrate surface with a copolymer of Formula I

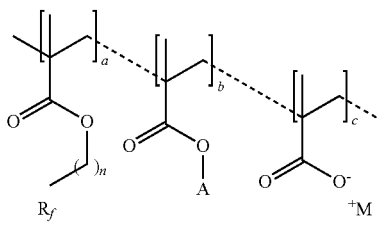

wherein
$R_f$ is $C_2$ to $C_{10}$ fluoroalkyl, optionally interrupted by one or more —O—, —CH$_2$—, —CFH—, or combinations thereof;
n is an integer from 1 to 10;
A is a linear, branched, or cyclic carbonate;
$M^+$ is $H^+$, $NH_4^+$, $Na^+$, $Li^+$, $Cs^+$, $K^+$ or mixtures thereof;
a is 20 to 80 mol %;
b is 5 to 80 mol %; and
c is 0 to 70 mol %,
wherein the sum of a+b+c is equal to 100%;
to provide stain resistance, oil and water repellency.

13. A method of claim 12 wherein the copolymer of Formula I is in the form of a dispersion.

14. A method of claim 12 wherein the contacting is by brushing, spraying, rollering, dipping, padding, doctor blade, wipe, dip techniques, or wet-on-wet procedure.

15. A method of claim 11 wherein the substrate is unglazed concrete, brick, tile, stone, grout, mortar, composite materials, gypsum board, marble, statuary, monuments, or wood.

16. A method of claim 11 wherein the substrate is woven and nonwoven fibers, yarns, fabrics, fabric blends, textiles, nonwovens, paper, leather, rugs or carpets.

17. A method of claim 16, where the substrate is cotton, cellulose, wool, silk, polyamide, polyester, polyolefin, polyacrylonitrile, polypropylene, rayon, nylon, aramid, or acetate.

18. A substrate treated with a method of claim 11, which is unglazed concrete, brick, tile, stone, grout, mortar, composite materials, gypsum board, marble, statuary, monuments, or wood.

19. A substrate treated with a method of claim 11, which is woven and nonwoven fibers, yarns, fabrics, fabric blends, textiles, nonwovens, paper, leather, rugs or carpets.

20. A substrate treated with a method of claim 19, which is cotton, cellulose, wool, silk, polyamide, polyester, polyolefin, polyacrylonitrile, polypropylene, rayon, nylon, aramid, or acetate.

* * * * *